United States Patent
Engström et al.

(10) Patent No.: US 10,893,456 B2
(45) Date of Patent: Jan. 12, 2021

(54) WIRELESS DEVICE, RADIO NETWORK NODES AND METHODS PERFORMED THEREIN FOR HANDLING NEIGHBOUR RELATIONSHIPS IN A WIRELESS NETWORK

(71) Applicant: Telefonaktiebolaget LM Ericsson (publ), Stockholm (SE)

(72) Inventors: Stefan Engström, Linköping (SE); Daniel Henriksson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 3 days.

(21) Appl. No.: 16/344,415

(22) PCT Filed: Oct. 26, 2016

(86) PCT No.: PCT/SE2016/051040
§ 371 (c)(1),
(2) Date: Apr. 24, 2019

(87) PCT Pub. No.: WO2018/080356
PCT Pub. Date: May 3, 2018

(65) Prior Publication Data
US 2020/0053609 A1 Feb. 13, 2020

(51) Int. Cl.
*H04W 36/00* (2009.01)
*H04W 36/36* (2009.01)
(Continued)

(52) U.S. Cl.
CPC ....... *H04W 36/38* (2013.01); *H04W 36/0033* (2013.01); *H04W 36/0055* (2013.01);
(Continued)

(58) Field of Classification Search
CPC ............ H04W 36/38; H04W 36/0033; H04W 74/0833; H04W 36/0055; H04W 36/36;
(Continued)

(56) References Cited

U.S. PATENT DOCUMENTS 9,479,989 B1    10/2016  Mehta et al.
2015/0264607 A1  9/2015  Chaudhuri et al.
(Continued)

FOREIGN PATENT DOCUMENTS

EP    2214452 A1    8/2010
EP    3073779 A1    9/2016
(Continued)

*Primary Examiner* — Moo Jeong
(74) *Attorney, Agent, or Firm* — Sage Patent Group

(57) ABSTRACT

Method performed by a wireless device (10) for handling neighbour relationships between radio network nodes (12, 13, 15) in a wireless communication network. The wireless device is served by a first radio network node (12) in the wireless communication network (1). The wireless device (10) receives (401), from the first radio network node (12), a report indication indicating that the wireless device is to report information identifying the first radio network node (12) to another radio network node (13). The wireless device receives (402) a signal from a second radio network node (13) which signal is associated with the second radio network node (13); and transmits (405), to the second radio network node (13), the information identifying the first radio network node (12).

8 Claims, 11 Drawing Sheets

FIG. 5

(51) Int. Cl.
*H04W 36/38* (2009.01)
*H04W 48/16* (2009.01)
*H04W 72/04* (2009.01)
*H04W 74/08* (2009.01)
*H04W 76/11* (2018.01)
*H04W 92/20* (2009.01)

(52) U.S. Cl.
CPC ... *H04W 36/0061* (2013.01); *H04W 36/0094* (2013.01); *H04W 36/00835* (2018.08); *H04W 36/36* (2013.01); *H04W 48/16* (2013.01); *H04W 72/0406* (2013.01); *H04W 74/0833* (2013.01); *H04W 76/11* (2018.02); *H04W 92/20* (2013.01)

(58) Field of Classification Search
CPC ........... H04W 76/11; H04W 36/00835; H04W 36/0061; H04W 36/0094; H04W 48/16; H04W 72/0406; H04W 92/20
See application file for complete search history.

(56) References Cited

U.S. PATENT DOCUMENTS

2017/0332419 A1* 11/2017 Kim ................. H04L 1/1861
2018/0084449 A1* 3/2018 Breuer ................ H04W 36/30
2019/0028860 A1* 1/2019 Futaki .................. H04W 88/06

FOREIGN PATENT DOCUMENTS

| WO | 2010114435 A1 | 10/2010 | |
|----|---------------|---------|---|
| WO | 2011139857 A1 | 11/2011 | |
| WO | WO-2016150969 A1 * | 9/2016 | ............ H04W 36/36 |

* cited by examiner

WIRELESS DEVICE, RADIO NETWORK NODES AND METHODS PERFORMED THEREIN FOR HANDLING NEIGHBOUR RELATIONSHIPS IN A WIRELESS NETWORK

TECHNICAL FIELD

Embodiments herein relate to a wireless device, radio network nodes and methods performed therein regarding wireless communication. In particular, embodiments herein relate to handling neighbour relationship between the radio network nodes in a wireless communication network.

BACKGROUND

In a typical wireless communication network, wireless devices, also known as wireless communication devices, mobile stations, stations (STA) and/or user equipments (UE), communicate via a Radio Access Network (RAN) to one or more core networks (CN). The RAN covers a geographical area which is divided into service areas or cell areas, with each service area or cell area being served by a radio network node e.g., a Wi-Fi access point or a radio base station (RBS), which in some networks may also be called, for example, a "NodeB" or "eNodeB". The service area or cell area is a geographical area where radio coverage is provided by the radio network node. The radio network node operates on radio frequencies to communicate over an air interface with the wireless devices within range of the access node. The radio network node communicates over a downlink (DL) to the wireless device and the wireless device communicates over an uplink (UL) to the radio network node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for communication with user equipments. In a forum known as the Third Generation Partnership Project (3GPP), telecommunications suppliers propose and agree upon standards for present and future networks e.g. UTRAN, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. The RNCs are typically connected to one or more core networks.

Specifications for the Evolved Packet System (EPS) have been completed within the $3^{rd}$ Generation Partnership Project (3GPP) and this work continues in the coming 3GPP releases for e.g. $4^{th}$ and $5^{th}$ generation networks. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a 3GPP radio access technology wherein the access nodes are directly connected to the EPC core network. As such, the Radio Access Network (RAN) of an EPS has an essentially "flat" architecture comprising access nodes connected directly to one or more core networks.

The 3GPP is currently working on standardization of the 5th generation (5G) of radio access system, also called New Radio (NR) network. An evolved architecture for the RAN is foreseen, both for the LTE Evolution and the New Radio tracks of 5G. This includes a solution where the radio base stations may be split into parts for radio network control, packet processing and radio nodes (RN) with base-band processing and radio units. An example of the new architecture is shown in FIG. 1, indicating possible interfaces and also Radio Control Nodes (RCN) and Packet Processing Node (PPN).

The NR network need to be connected to some core network that provides non-access stratum (NAS) functions and connection to communication networks outside NR, like the internet. This is here shown as a core network as specified by 3GPP.

Existing solutions rely on frequent broadcast of cell identities and other radio area identities from all radio nodes all the time. These identities can then quickly be read by wireless devices in the wireless communication network and be reported to a serving radio network node such as a RCN or RN. The serving radio network node can then identify neighbour cells and radio network nodes.

The broadcast and neighbour identification is illustrated in FIG. 2. Firstly the RNs/RCNs broadcast their identities. A first RN/RCN (RN1,RCN1) may then request a UE to report neighbor radio network nodes e.g. by transmitting a report order i.e. ordering a neighbour report. The UE identifies e.g. a second RN/RCN (RN2,RCN2) by receiving an identity broadcasted. The UE then reports the identified RN2/RCN2 in a neighbour report back to the RN1/RCN1.

The frequent broadcast of identities causes a lot of energy waste and also interference to the communication from other radio network nodes. If this is solved by less frequent identity broadcast, the time to identify a new neighbour radio network node will instead increase and cause disturbances or drops in the ongoing communication for the wireless device involved. This will thus lead to a limited performance of the wireless communication network.

SUMMARY

An object of embodiments herein is to provide a mechanism that improves the performance of the wireless communication network when handling neighbour relationships between radio network nodes.

According to an aspect the object is achieved by providing a method performed by a wireless device for handling neighbour relationships between radio network nodes in a wireless communication network. The wireless device is served by a first radio network node in the wireless communication network. The wireless device receives, from the first radio network node, a report indication indicating that the wireless device is to report information identifying the first radio network node to another radio network node. The wireless device further receives a signal from a second radio network node, which signal is associated with the second radio network node. The wireless device further transmits, to the second radio network node, the information identifying the first radio network node.

According to another aspect the object is achieved by providing a method performed by a first radio network node for handling neighbour relationships between radio network nodes in a wireless communication network. The first radio network node serves a wireless device in the wireless communication network. The first radio network node transmits, to the wireless device, a report indication indicating that the wireless device is to report information identifying the first radio network node to another radio network node.

According to yet another aspect the object is achieved by providing a method performed by a second radio network node for handling neighbour relationships between radio network nodes in a wireless communication network. The wireless communication network comprises a first radio network node serving a wireless device. The second radio network node transmits a signal to the wireless device, which signal is associated with the second radio network node. The second radio network node receives, from the wireless device, information identifying the first radio network node. The second radio network node then determines whether to establish a neighbour relationship with the first radio network node based on the received information.

According to still another aspect the object is achieved by providing a wireless device for handling neighbour relationships between radio network nodes in a wireless communication network. The wireless device is configured to be served by a first radio network node in the wireless communication network. The wireless device is further being configured to receive, from the first radio network node, a report indication indicating that the wireless device is to report information identifying the first radio network node to another radio network node. The wireless device is further configured to receive a signal from a second radio network node, which signal is associated with the second radio network node, and to transmit, to the second radio network node, the information identifying the first radio network node.

According to yet still another aspect the object is achieved by providing a first radio network node for handling neighbour relationships between radio network nodes in a wireless communication network. The first radio network node is configured to serve a wireless device in the wireless communication network. The first radio network node is further configured to transmit to the wireless device, a report indication indicating that the wireless device is to report information identifying the first radio network node to another radio network node.

According to a further aspect the object is achieved by providing a second radio network node for handling neighbour relationships between radio network nodes in a wireless communication network. The wireless communication network comprises a first radio network node serving a wireless device. The second radio network node is configured to transmit a signal to the wireless device, which signal is associated with the second radio network node. The second radio network node is further configured to receive, from the wireless device, information identifying the first radio network node. The second radio network node is further configured to determine whether to establish a neighbour relationship with the first radio network node based on the received information.

It is herein also provided a computer program comprising instructions, which, when executed on at least one processor, causes the at least one processor to carry out the methods herein, as performed by the wireless device, the first radio network node, or the second radio network node. Furthermore, it is herein provided a computer-readable storage medium, having stored thereon a computer program comprising instructions which, when executed on at least one processor, cause the at least one processor to carry out the methods herein, as performed by the wireless device, the first radio network node, or the second radio network node.

Embodiments herein discloses an efficient manner of setting up neighbour relationships in the wireless communication network. The first radio network node initiates a neighbour relationship setup by transmitting the report indication. This results in an efficient signaling enabling neighbour setup leading to an improved performance of the wireless communication network since resources are utilized in an efficient manner.

BRIEF DESCRIPTION OF THE DRAWINGS

Embodiments will now be described in more detail in relation to the enclosed drawings, in which.

DETAILED DESCRIPTION

Figure 1:
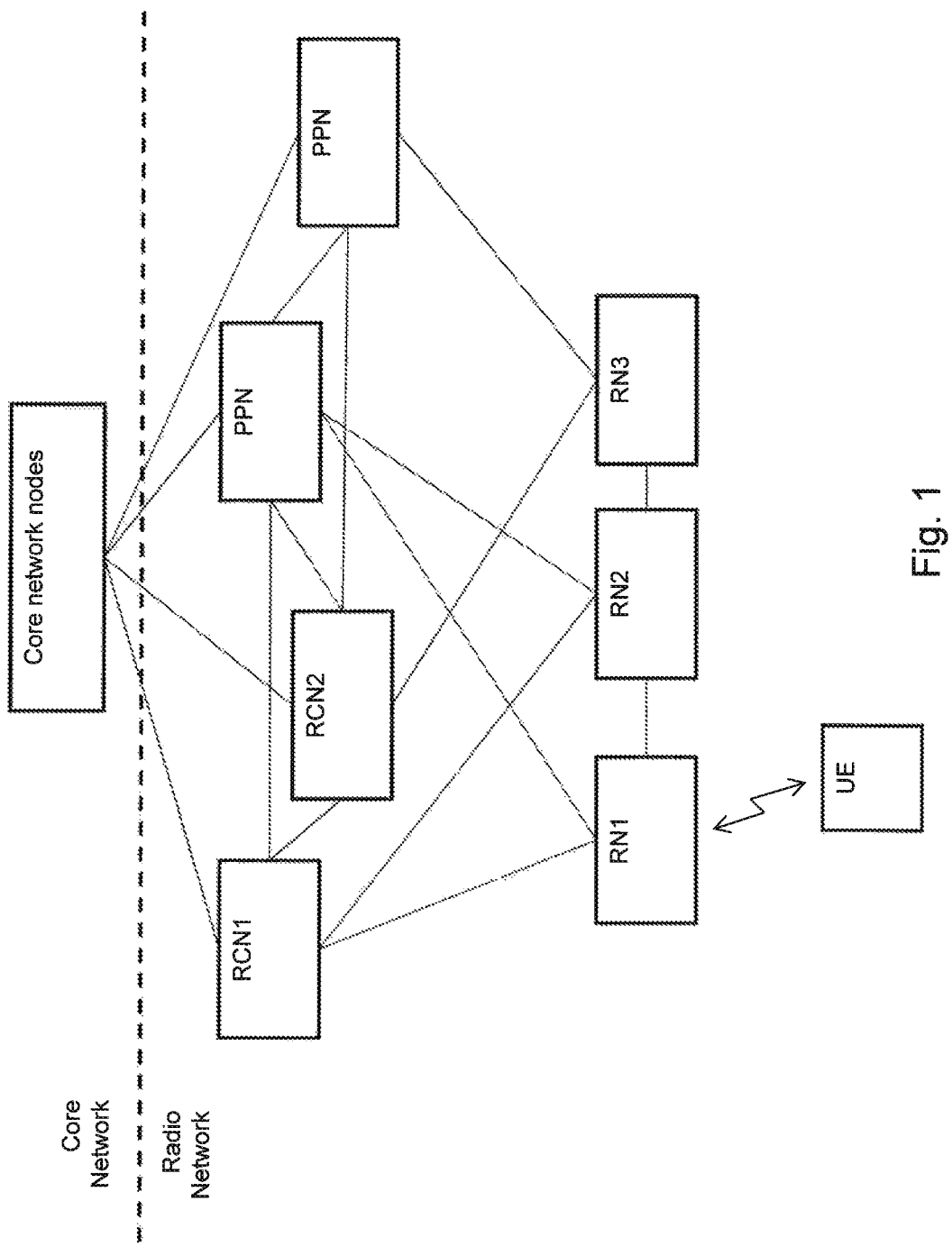
FIG. 1 shows a network architecture according to a New Radio (NR) network.
Figure 2:
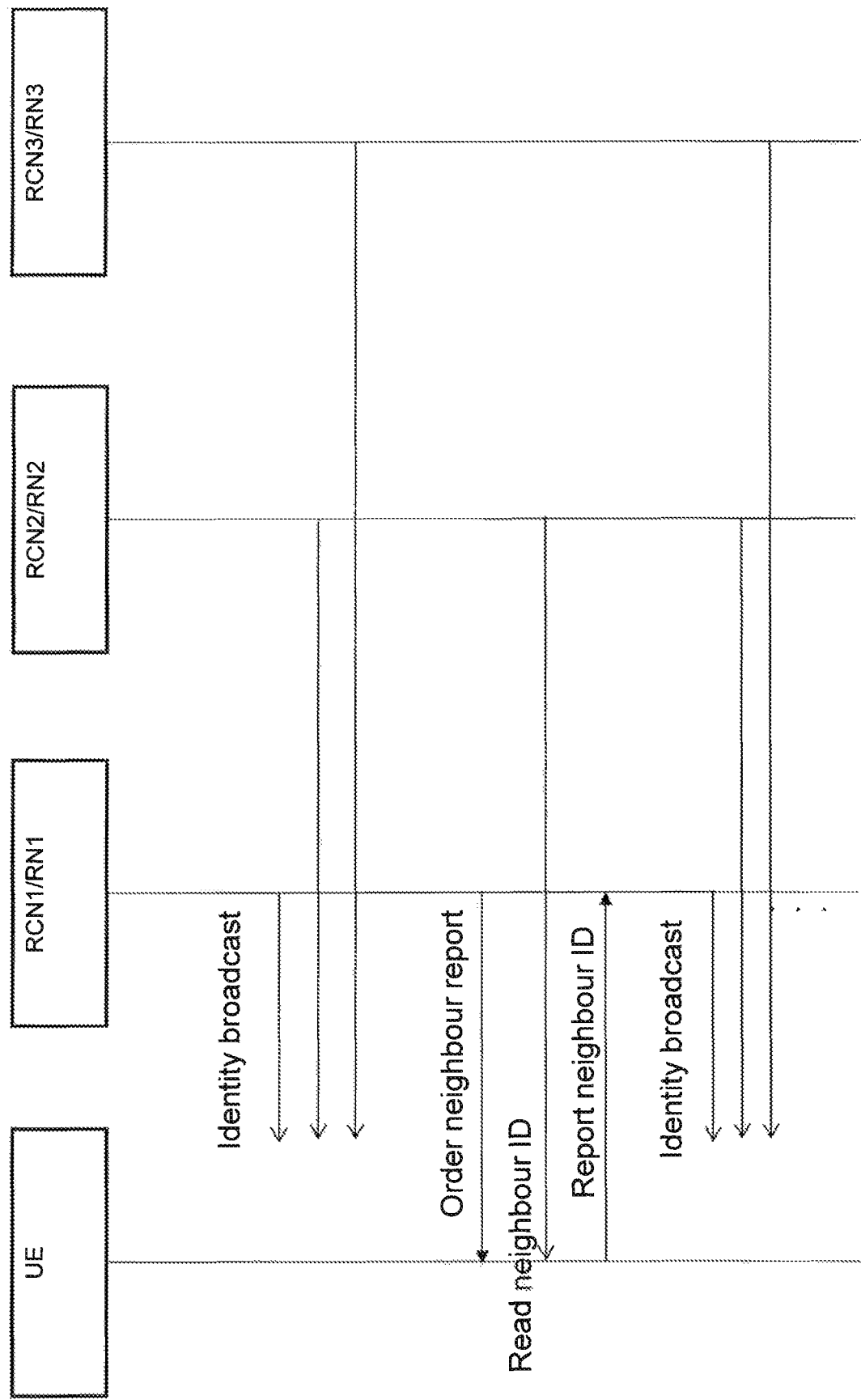
FIG. 2 shows a current broadcast and neighbour identification.
Figure 3:
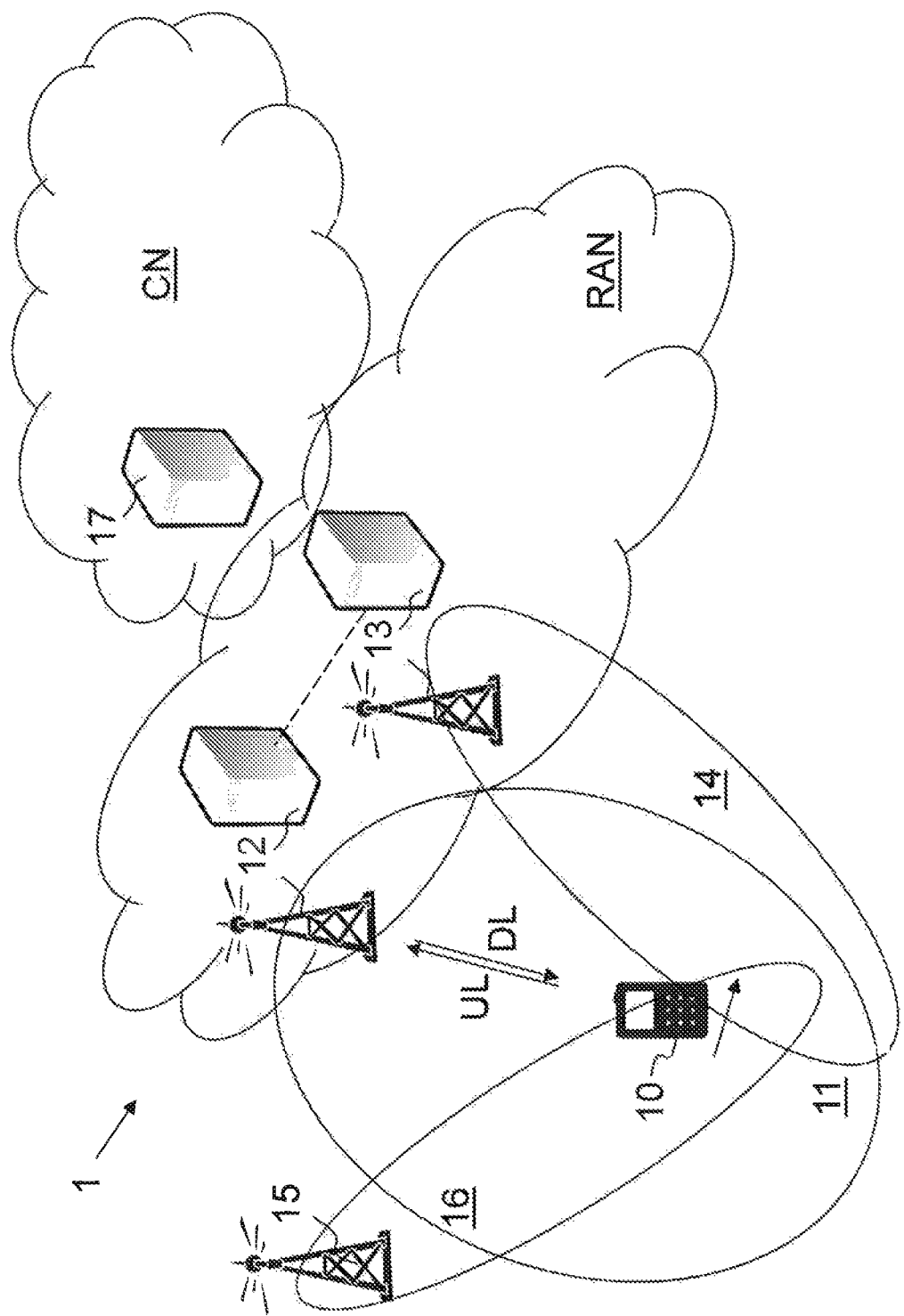
FIG. 3 is a schematic overview depicting a wireless communication network according to embodiments herein.

Embodiments herein relate to wireless communication networks in general. FIG. 3 is a schematic overview depicting a wireless communication network 1. The wireless communication network 1 comprises one or more RANs and one or more CNs. The wireless communication network 1 may use one or a number of different technologies, such as NR, Wi-Fi, Long Term Evolution (LTE), LTE-Advanced, Fifth Generation (5G), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

In the wireless communication network 1, wireless devices e.g. a wireless device such as a mobile station, a non-access point (non-AP) STA, a STA, a user equipment and/or a wireless terminal, communicate via one or more Access Networks (AN), e.g. RAN, to one or more core networks (CN). It should be understood by the skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station capable of communicating using radio communication with a network node within an area served by the network node.

The wireless communication network 1 comprises a first radio network node 12 providing radio coverage over a geographical area, a first service area 11, of a first radio access technology (RAT), such as NR, LTE, Wi-Fi, WiMAX or similar. The first radio network node 12 may be a transmission and reception point e.g. a radio network node such as a Wireless Local Area Network (WLAN) access point or an Access Point Station (AP STA), an access node, an access controller, a radio controller node, a radio node, a base station, e.g. a radio base station such as a NodeB, an evolved Node B (eNB, eNodeB), a base transceiver station, a radio remote unit, an Access Point Base Station, a base station router, a transmission arrangement of a radio base station, a stand-alone access point or any other network unit or node capable of communicating with a wireless device within the area served by the first network node 12 depending e.g. on the first radio access technology and terminology used. The first radio network node 12 may alternatively or additionally be a controller node or a packet processing node such as a radio controller node or similar. The first network node may be referred to as a serving network node wherein the first cell may be referred to as a serving cell, and the serving network node communicates with the wireless device 10 in form of DL transmissions to the wireless device 10 and UL transmissions from the wireless device 10.

The wireless communication network 1 further comprises a second radio network node 13 providing radio coverage over a geographical area, a second service area 14, of a second radio access technology (RAT), such as NR, LTE, WiMAX or similar. The second radio network node 13 may be a transmission and reception point e.g. a radio network node such as a Wireless Local Area Network (WLAN) access point or an Access Point Station (AP STA), an access node, an access controller, a radio controller node, a radio node, a base station, e.g. a radio base station such as a NodeB, an evolved Node B (eNB, eNode B), a base transceiver station, a radio remote unit, an Access Point Base Station, a base station router, a transmission arrangement of a radio base station, a stand-alone access point or any other network unit or node capable of communicating with a wireless device within the area served by the second radio network node 13 depending e.g. on the first radio access technology and terminology used. The second radio network node 13 may alternatively or additionally be a controller node or a packet processing node such as a radio controller node or similar. The second radio network node 13 may be referred to as a neighbouring network node wherein the second service area may be referred to as a neighbouring cell, and the second radio network node communicates with the wireless device 10 in form of DL transmissions to the wireless device 10 and UL transmissions from the wireless device 10. The wireless communication network 1 may further comprise a third radio network node 15 providing radio coverage over a third service area 16.

It should be noted that a service area may be denoted as cell, beam, beam group or similar to define an area of radio coverage. The first and second RAT may be the same RAT. The communication between the radio access network and the wireless device 10 may be controlled by a radio control node while lower layers are realized in a radio node. In the following communication between wireless device and a radio network node may be between the wireless device 10 and the radio control node, even though the radio node is always involved. Herein the functions of a radio control node and a radio node are implemented in the same physical radio network node but these may be divided between separate nodes.

The wireless communication network node 1 further comprises a core network node 17 such as a Mobility Managing Entity, serving gateway or similar.

According to embodiments herein an efficient manner of setting up neighbour relationship between the radio network nodes is provided. The first radio network node 12 transmits a report indication indicating that the wireless device is to report information identifying the first radio network node 12 to another radio network node. The first radio network node 12 thus orders the wireless device 10 to report the identity of the first radio network node to another radio network node e.g. to a preferred or a best neighbour radio network node the wireless device 10 can find. The wireless device 10 may find the best or possible neighbour radio network nodes by performing a random access from its current location to all present radio network nodes and from random access responses the wireless device 10 may select the best neighbour radio network node or nodes e.g. the second radio network node 13 having the random access response with a highest signal strength. The wireless device 10 will in e.g. a following uplink message report the information such as an identity of the first radio network node 12 to the second radio network node 13. The wireless device 10 may then abort the random access procedure, i.e. a connection setup, without consuming any extra resources in second radio network node 13. The second radio network node 12 may in its turn then create a neighbour relation to the first radio network node 12 based on the received information and inform the first radio network node 12 so that the first radio network node 12 can create a neighbour relation to the second radio network node 13. Thus, an efficient manner of setting up neighbour relationships is provided herein.

Figure 4:
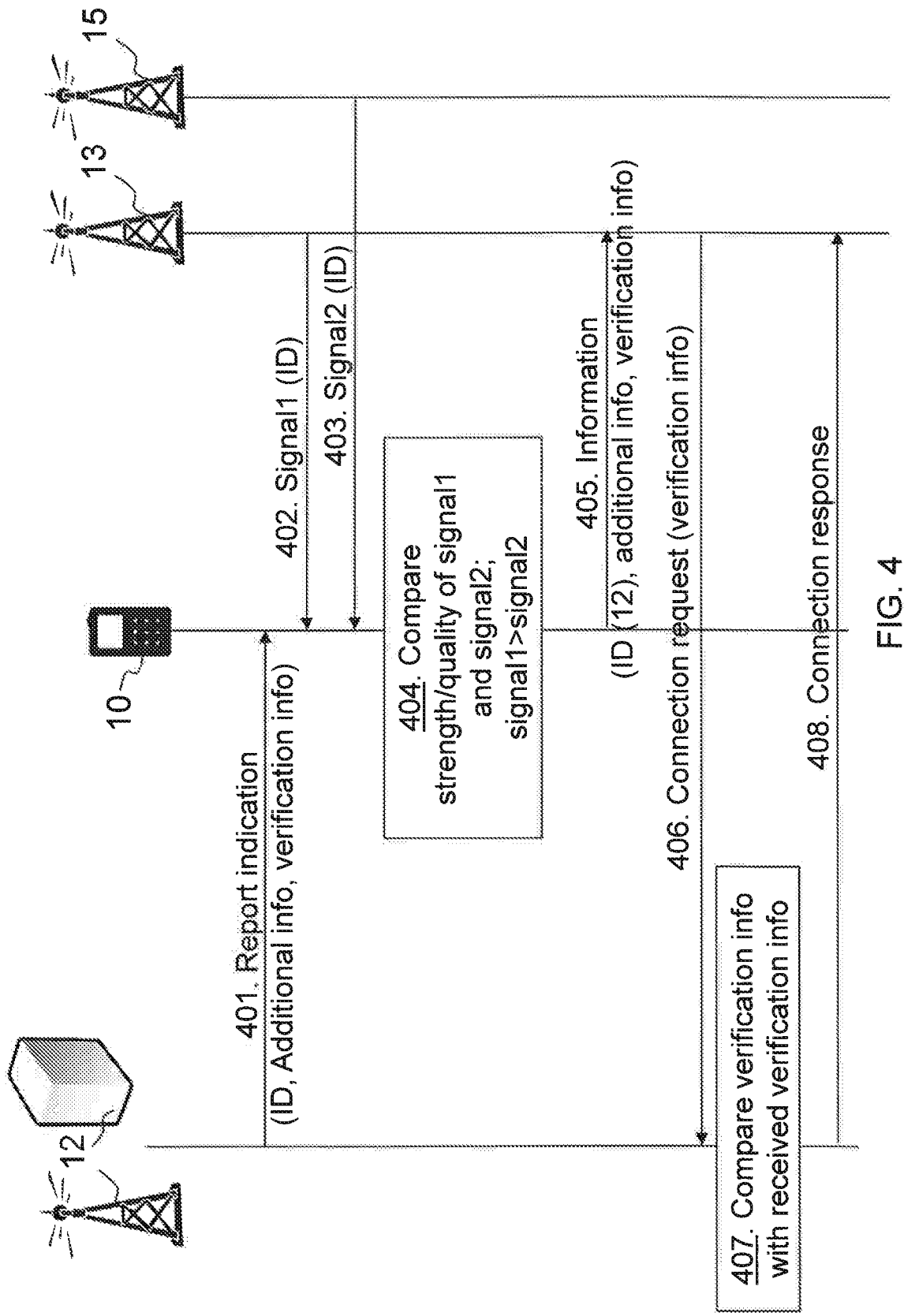
FIG. 4 shows a combined flowchart and signaling scheme according to some embodiments herein.

FIG. 4 is a schematic combined flowchart and signaling scheme according to some embodiments herein.

Action 401. The first radio network node 12 transmits the report indication to the wireless device 10, e.g. broadcast the report indication in the first service area 11. This report indication may indicate transfer of identity of the first radio network node to a preferred radio network node. Preferred herein meaning a radio network node with a signal of a signal strength or quality above a threshold or above other signal strengths or qualities of other radio network nodes. The report indication may comprise ID of the first radio network node or similar. The first radio network node 12 may include in the request for ID transfer, also thresholds for accepting a neighbour, lists of already known neighbours which not need to be contacted, frequency on which to send the random access etc. The first radio network node may further thus transmit identity of the first radio network node, additional information, and verification information and more. The identity of a radio network node may be a globally unique ID, like EUtran Cell Global Identity (ECGI) in LTE. It may also be locally rare, to the extent that the second radio network node 13 can find the one or few first radio network node candidates that are reasonable to contact for verification. The identity may be fixed or dynamic. In case the identity is dynamic, the second radio network node 13 may have to contact another network node for the mapping between the dynamic and fixed ID, e.g. a domain name server. The ID may include only the identity of the first radio network node 12 that controls the radio communication but also supplementary information on e.g. RN ID, antenna point ID, cell ID, sub-cell area ID like beam ID etc.

Action 402. The second radio network node 13 transmits a signal, Signal1, e.g. a reference signal, associated with the second radio network node e.g. carrying an ID or RA preamble identifying the second radio network node 13.

Action 403. The third radio network node 15 transmits a signal, Signal2, e.g. a reference signal, associated with the second radio network node e.g. carrying an ID or RA preamble identifying the third radio network node 15. These signals may be initiated by a respective random access request from the wireless device 10.

Action 404. The wireless device 10 may then compare signal strength or quality to each other and/or to a threshold to e.g. determine the preferred radio network node. E.g. the signal1 is stronger than the signal2 at the wireless device 10 and thus the wireless device 10 determines the second radio network node 13 to be the preferred radio network node. These signals may be random access responses of a random access process. The wireless device 10 may in some embodiments compare the signal strength or quality of the different radio network nodes such as compare the signal strength or quality of the second and third radio network node with signal strength or quality of the first radio network node 12. The wireless device 10 may compare the signal strength or quality of the different radio network nodes with a margin threshold added to the signal strength or quality of the first radio network node 12.

Action 405. The wireless device 10 then transmits the information identifying the first radio network node 12 to the second radio network node 13. The ID of the first radio network node 12 may contain enough information for the second radio network node 13 to route the neighbour relation information to the first radio network node 12 either directly or via other network nodes. Optionally, additional information on how the second radio network node 13 can contact the first radio network node 12, may also be transferred to the second radio network node 13. Furthermore, the wireless device 10 may transmit verification information to the second radio network node 13. It should be understood that the wireless device 10 may abort the connection setup to second radio network node 13 after transmission of the information. The transfer of the identity of the first radio network node 12 early during connection setup and the abortion of the connection setup, makes the resource consumption minimal in the second radio network node 13. Transferring the additional information on how to contact the first radio network node 12 from the second radio network node 13, makes it possible to connect e.g. directly over an IP network or via another node. Transferring the verification information makes it possible to decide the correct originating first radio network node, in e.g. a case of reused radio network node identities, and also enabling to exclude erroneous or rough identities sent to second radio network node 13 from the wireless device.

Action 406. The second radio network node 13 may then determine to establish a neighbour relationship with the first radio network node 12 based on the received information, and transmit a connection request to the first radio network node 12. The connection request may comprise the verification information, e.g. any unique enough number generated by the first radio network node 12 for this specific wireless device 10 at this time. Thus, the second radio network node 13 may transfer information on the neighbour relationship to the first radio network node 12 including e.g. identity of the second radio network node 13 and verification information.

Action 407. The first radio network node 12 may then receive the connection request verify the connection request by comparing the verification information sent and the verification information received in the connection request. Upon a match the first radio network node 12 may create a neighbour relationship to the second radio network node 13.

Action 408. The first radio network node 12 may then transmit a confirmation or confirmation information to the second radio network node 13. Hence the first radio network node verifies the neighbour relation and sends a verification result i.e. the confirmation information, to the second radio network node 13. The second radio network node 13 receives the verification result and keeps or removes the neighbour relation based on the verification result. Hence, an X2-connection between the first and second radio network node 13 may have been established.

Figure 5:
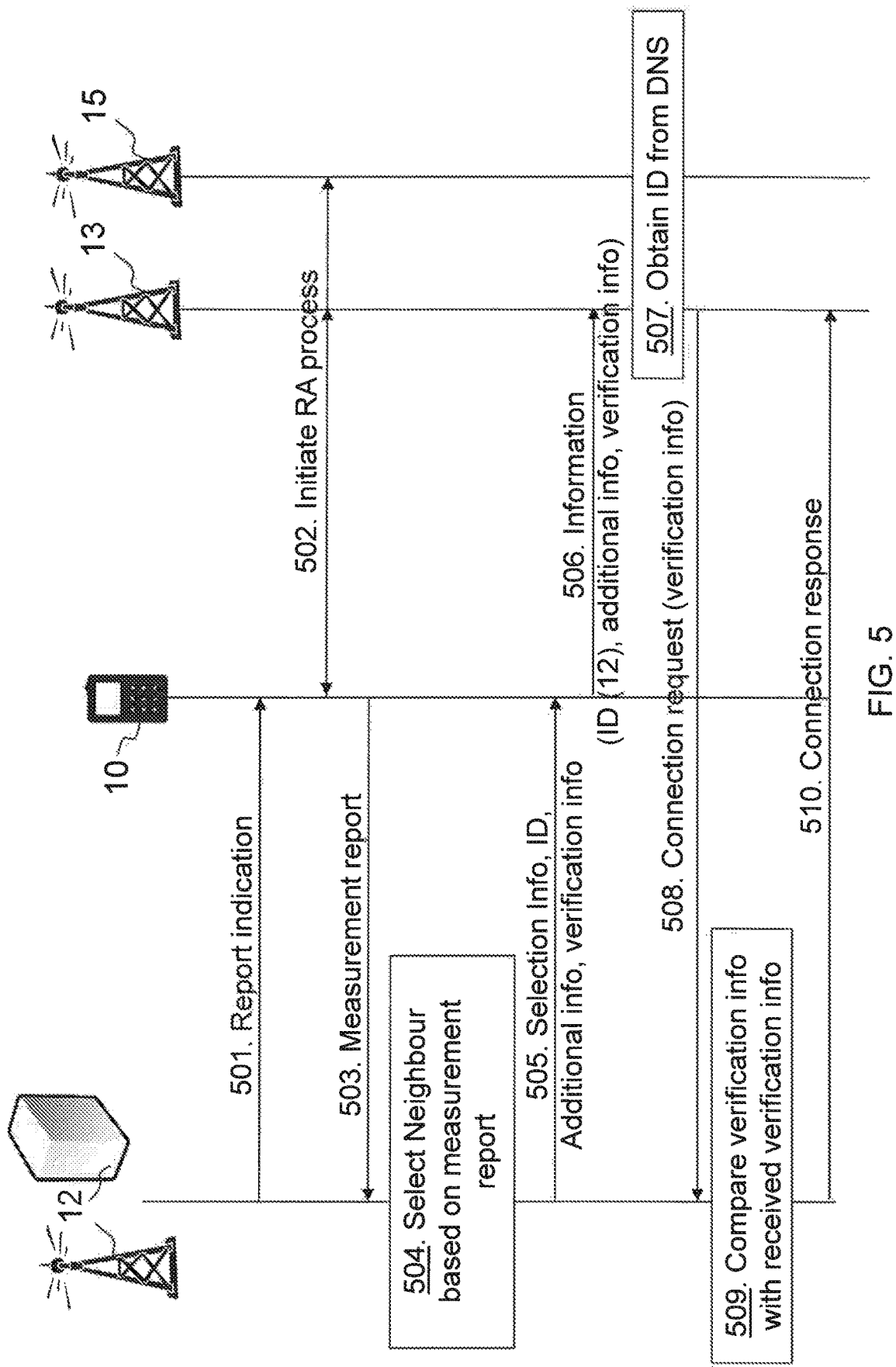
FIG. 5 shows a combined flowchart and signaling scheme according to some embodiments herein.

FIG. 5 is a schematic combined flowchart and signaling scheme according to some embodiments herein.

Action 501. The first radio network node transmits the report indication to the wireless device 10, e.g. broadcast the report indication in the first service area 11. This report indication may indicate transfer of identity of the first radio network node to the preferred radio network node. This corresponds to the action 401 in FIG. 4.

Action 502. The wireless device 10 may send a random access request to all surrounding radio network nodes such as second and third radio network nodes.

Action 503. The wireless device 10 may then measure signal strengths and/or qualities of random access responses from respective radio network node and report this to the first radio network node 12 in a measurement report.

Action 504. The first radio network node 12 may then compare signal strengths and/or qualities of random access responses from respective radio network node to select or determine a preferred radio network node or also referred to as a best neighbour radio network node.

Action 505. The first radio network node 12 may then transmit a selection indication indicating the selected radio network node such as identity of the second radio network node 13. The selection indication may further comprise identity of the first radio network node, additional information and/or verification information. Parts or all of this information may be transmitted in the report indication or in the selection indication.

Action 506. The wireless device 10 then transmits the information identifying the first radio network node 12 to the second radio network node 13. The ID of the first radio network node 12 may contain enough information for the second radio network node 13 to route the neighbour relation information to the first radio network node 12 either directly or via other network nodes. Optionally, additional information on how the second radio network node 13 can contact the first radio network node 12, may also be transferred to the second radio network node 13. Furthermore, the wireless device 10 may transmit verification information to the second radio network node 13. It should be understood that the wireless device 10 may abort the connection setup to second radio network node 13 after transmission of the information. The transfer of the identity of the first radio network node 12 early during connection setup and the abortion of the connection setup, makes the resource consumption minimal in the second radio network node 13.

Action 507. The second radio network node 13 may then determine to establish a neighbour relationship with the first radio network node 12 based on the received information. For example, the identity of the first radio network node 12 may be used and/or additional information may be needed, like IP address, Virtual Local Area Network (VLAN) ID, Tracking Area Identity. The additional information may be received via the wireless device 10 together with the ID, or as illustrated looked up in a server node, like DNS server or Operation and maintenance (OaM) system.

Action 508. The second radio network node 13 may then transmit a connection request to the first radio network node 12. The connection request may comprise the verification information, e.g. any unique enough number generated by the first radio network node 12 for this specific wireless device 10 at this time. Thus, the second radio network node 13 may transfer information on the neighbour relationship to the first radio network node 12 including e.g. identity of the second radio network node 13 and verification information.

Action 509. The first radio network node 12 may then receive the connection request verify the connection request by comparing the verification information sent and the verification information received in the connection request. Upon a match the first radio network node 12 may create a neighbour relationship to the second radio network node 13.

Action 510. The first radio network node 12 may then transmit a confirmation or confirmation information to the second radio network node 13. Hence the first radio network node verifies the neighbour relation and sends a verification result i.e. the confirmation information, to the second radio network node 13. The second radio network node 13 receives the verification result and keeps or removes the neighbour relation based on the verification result. Hence, an X2-connection between the first and second radio network node 13 may have been established.

Embodiments herein shows a solution where always broadcasting identity information from all radio network node is avoided, resulting in saving energy and reducing interference in the wireless communication network.

Transfer of the verification information, makes it possible to decide the correct originating RCN1, in case of reused RCN1 identities.

Transfer of the verification information, makes it possible to exclude erroneous or rough RCN1 identities sent to RCN2 from a UE.

Figure 6:
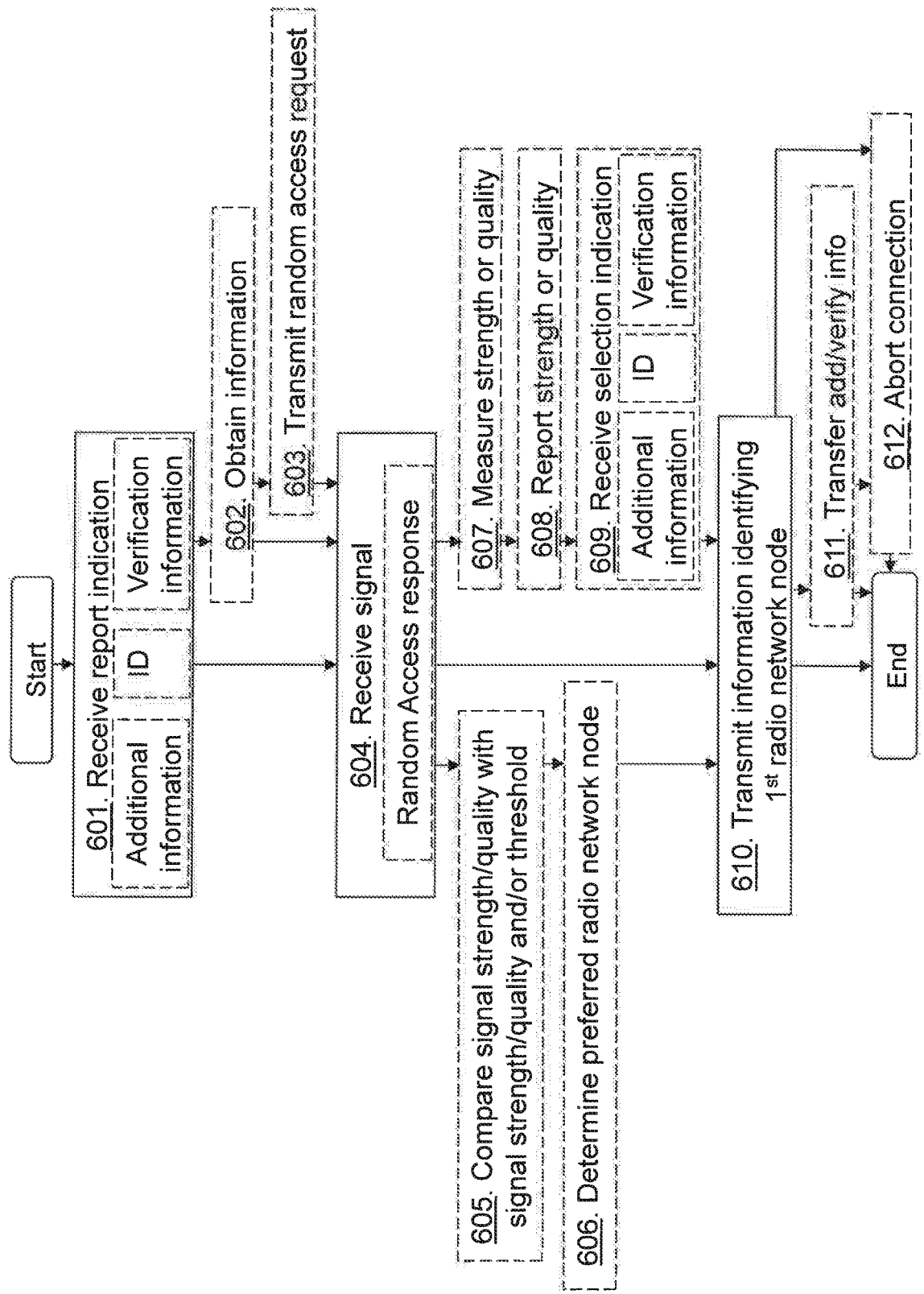
FIG. 6 shows a flowchart according to a method performed by a wireless device according to embodiments herein.

The method actions performed by the wireless device 10 for handling neighbour relationship between the radio network nodes in the wireless communication network 1 according to some embodiments will now be described with reference to a flowchart depicted in FIG. 6. The wireless device 10 is served by the first radio network node 12 in the wireless communication network The actions do not have to be taken in the order stated below, but may be taken in any suitable order. Actions performed in some embodiments are marked with dashed boxes.

Action 601. The wireless device 10 receives, from the first radio network node 12, the report indication indicating that the wireless device is to report information identifying the first radio network node 12 to another radio network node. The report indication may comprise the identity of the first radio network node 12 identifying the first radio network node 12. When receiving the report indication the wireless device 10 may further receive additional information from the first radio network node 12, which additional information indicates how to contact the first radio network node 12. Additionally or alternatively, the wireless device 10 may receive verification information, additional to the report indication, from the first radio network node 12, which verification information is to verify a connection between the first radio network node 12 and the other radio network node. The report indication may further comprise a list of already known neighbours, which shall not receive the information identifying the first radio network node 12.

Action 602. The wireless device 10 may obtain the information identifying the first radio network node 12, in the report indication, separately or from within the wireless device 10.

Action 603. The wireless device 10 may transmit a random access request of a connection setup to one or more radio network nodes.

Action 604. The wireless device 10 further receives the signal from the second radio network node 13, which signal is associated with the second radio network node 13. The received signal may be a received random access response from the second radio network node 13 setting up a connection between the wireless device 10 and the second radio network node 13. The signal may be associated with the second radio network node by carrying identity of the second radio network node. Alternatively, the signal may not comprise the identity of the second radio network node but may be associated with the second radio network node 13 by carrying e.g. a certain random access preamble, a certain reference signal or a scheduling assignment from the second radio network node for a next transmission from the wireless device, and thereby being associated with the second radio network node 13.

Action 605. The report indication may further indicate that the information is to be reported to the preferred radio network node and then the wireless device 10 may compare the signal strength or quality, e.g. reference signal received power/quality, of the signal from the second radio network node 13 with another signal strength or quality of another signal from one or more other radio network nodes. Additionally or alternatively, the wireless device 10 may compare the signal strength or quality of the signal from the second radio network node 13 with a threshold.

Action 606. The wireless device 10 may then determine that the second radio network node 13 is the preferred radio network node when the signal strength or quality is above the other signal strength or quality and/or the threshold.

Action 607. The wireless device 10 may measure the strength or quality of the signal from the second radio network node 13.

Action 608. The wireless device 10 may then report, to the first radio network node 12, the measured strength or quality. This report may further comprise measured strength or quality of the first radio network node 12.

Action 609. The wireless device 10 may furthermore receive a selection indication from the first radio network node, which selection indication indicates that the wireless device 10 is to report the information identifying the first radio network node to the second radio network node 13. The selection indication may comprise the identity of the first radio network node 12 identifying the first radio network node 12. The wireless device 10 may further receive additional information, additional to the selection indication, from the first radio network node 12, which additional information indicates how to contact the first radio network node 12. Additionally or alternatively, the wireless device 10 may receive verification information, additional to the selection indication, from the first radio network node 12, which verification information is to verify the connection between the first radio network node 12 and the other radio network node.

Action 610. The wireless device 10 transmits, to the second radio network node 13, the information identifying the first radio network node 12.

Action 611. The wireless device 10 may further transfer the additional information and/or the verification information to the second radio network node 13.

Action 612. The wireless device 10 may, after the information identifying the first radio network node 12 is transmitted to the second radio network node 13, abort the connection to the second radio network node 13. The wireless device 10 may abort the connection after the additional information and verification information have been received at the second radio network node 13.

Figure 7:
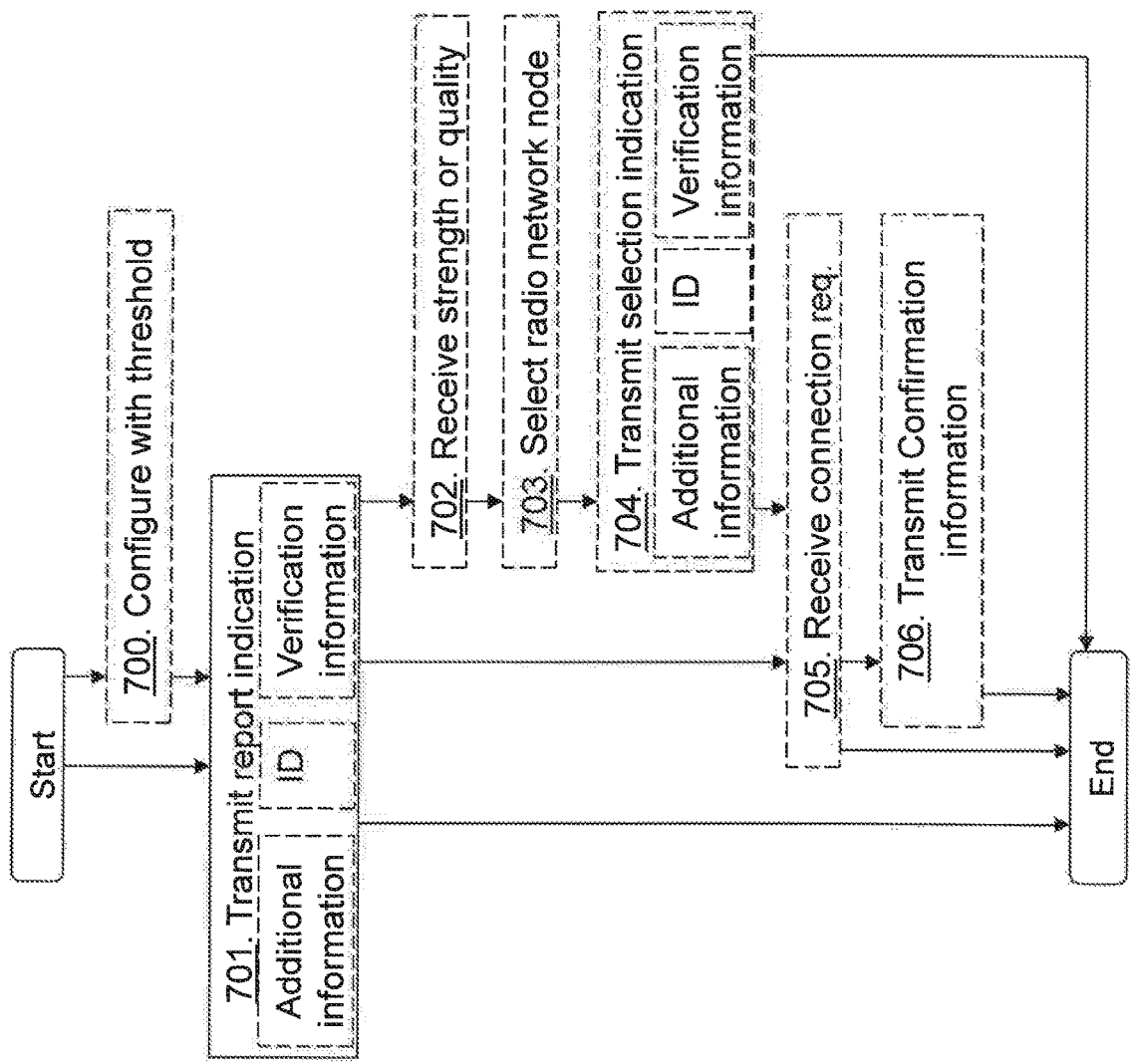
FIG. 7 shows a flowchart according to a method performed by a first radio network node according to embodiments herein.

The method actions performed by the first radio network node 12 for handling neighbour relationships between the radio network nodes in the wireless communication network 1 according to some embodiments will now be described with reference to a flowchart depicted in FIG. 7. The actions do not have to be taken in the order stated below, but may be taken in any suitable order. Actions performed in some embodiments are marked with dashed boxes. The first radio network node 12 serves the wireless device 10 in the wireless communication network 1.

Action 700. The first radio network node 12 may configure the wireless device with the threshold or thresholds of signal strength or quality.

Action 701. The first radio network node 12 transmits, to the wireless device 10, the report indication indicating that the wireless device 10 is to report information identifying the first radio network node to another radio network node. The report indication may further indicate that the information is to be reported to a preferred radio network node. The report indication may comprise the identity of the first radio network node 12 identifying the first radio network node 12. In addition the first radio network node 12 may transmit additional information to the wireless device for being transferred to the other radio network node, which additional information indicates how to contact the first radio network node 12. Additionally or alternatively, the first radio network node 12 may transmit the verification information to verify a connection between the first radio network node 12 and the other radio network node. The report indication may further comprise the list of already known neighbour radio network nodes, which shall not receive the information identifying the first radio network node 12.

Action 702. The first radio network node 12 may receive the measurement report from the wireless device 10, action 608 above, indicating the signal strength or quality of the second radio network node 13. This report may further comprise measured strength or quality of the first radio network node 12 at the wireless device 10.

Action 703. The first radio network node 12 may then select the second radio network node 13 as a neighbouring radio network node based on the received measurement report.

Action 704. The first radio network node 12 may furthermore transmit the selection indication to the wireless device 10. The selection indication indicates that the wireless device 10 is to report the information identifying the first radio network node 12 to the second radio network node 13, e.g. that the second radio network node is the preferred radio network node. The selection indication may comprise the identity of the first radio network node 12 identifying the first radio network node 12. Additionally, the first radio network node 12 may transmit the additional information to the wireless device 10 for being transferred to the other radio network node, which additional information indicates how to contact the first radio network node 12. Additionally or alternatively, the first radio network node 12 may transmit the verification information to verify a connection between the first radio network node 12 and the other radio network node.

Action 705. The first radio network node 12 may receive the connection request from the second radio network node 13 for establishing a neighbour relationship. For example, the first radio network node 12 may receive the verification information from the second radio network node 13 verifying the connection. The first radio network node 12 may compare the transmitted verification information with the received verification information to verify the connection.

Action 706. The first radio network node 12 may then transmit confirmation information verifying the connection request to the second radio network node 13.

Figure 8:
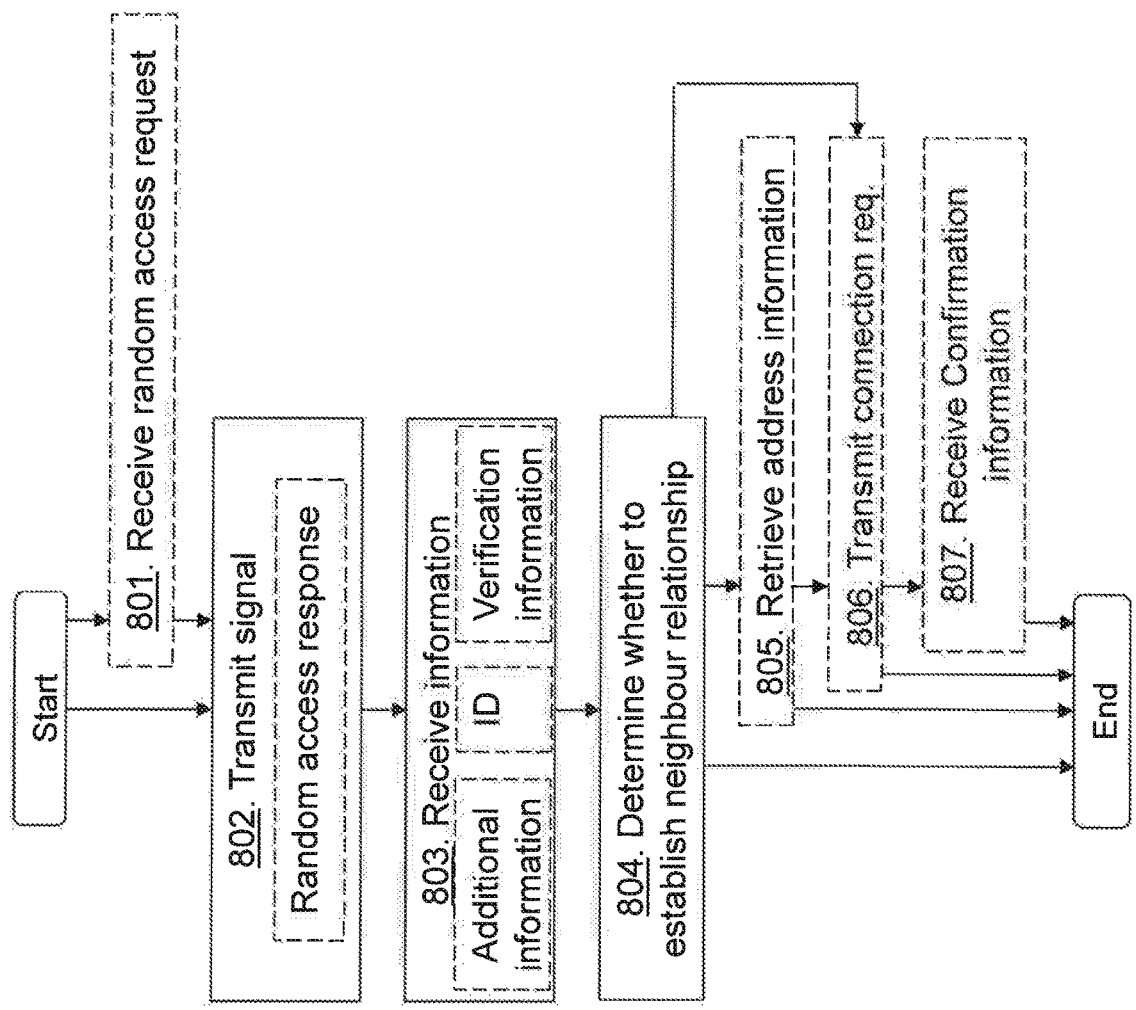
FIG. 8 shows a flowchart according to a method performed by a second radio network node according to embodiments herein.

The method actions performed by the second radio network node 13 for handling neighbour relationships between the radio network nodes in the communication network 1 according to some embodiments will now be described with reference to a flowchart depicted in FIG. 8. The actions do not have to be taken in the order stated below, but may be taken in any suitable order. Actions performed in some embodiments are marked with dashed boxes. The wireless communication network 1 comprises the first radio network node 12 serving the wireless device 10.

Action 801. The second radio network node 13 may receive, from the wireless device 10, the random access request of a connection setup.

Action 802. The second radio network node 13 transmits the signal to the wireless device 10, which signal is associated with the second radio network node 13. The second radio network node 13 may e.g. transmit the random access response, being an example of the signal, to the wireless device when receiving, from the wireless device 10, the random access request of a connection setup. The signal may be associated with the second radio network node by identifying the second radio network node e.g. by carrying an identity of the second radio network node. Additionally, alternatively, the signal may be associated with the second radio network node 13 by carrying e.g. the certain random access preamble, the certain reference signal or the scheduling assignment from the second radio network node for the next transmission from the wireless device. The signal may thus comprise information such as identity, a preamble, or a reference signal structure identifying the second radio network node 13.

Action 803. The second radio network node 13 receives, from the wireless device 10, information identifying the first radio network node 12. The information may comprise the identity of the first radio network node 12. The second radio network node 13 may further receive additional information from the wireless device 10, which additional information indicates how to contact the first radio network node 12. The second radio network node 13 may further receive verification information from the wireless device 10, which verification information is for verifying a connection between the first radio network node 12 and the second radio network node 13. In some embodiments, the connection to the wireless device 10, setup at the reception of the random access request, is aborted after the information identifying the first radio network node 12 is received. The connection may be aborted after receiving the additional information and the verification information.

Action 804. The second radio network node 13 determines whether to establish a neighbour relationship with the first radio network node 12 based on the received information. E.g. the second radio network node 13 may determine to establish a neighbour relationship with the first radio network node 12, or the second radio node 13 may, by earlier attempts, know that a neighbour relationship does not work or the second radio node 13 may have reached a limit for number of connections of neighbour relationships or the second radio node 13 may want info from several wireless devices before attempting setup.

Action 805. The second radio network node 13 may retrieve address information for the first radio network node 10 from another network node such as a Domain name server or similar.

Action 806. When determining to establish the neighbour relationship with the first radio network node 12, the second radio network node 13 may transmit a connection request to the first radio network node 12 for establishing the neighbour relationship using the received information and/or the received additional information. Additionally, the second radio network node 13 may transmit the verification information to the first radio network node 12 verifying the connection. The second radio network node 13 may use the address information, retrieved in action 805, to establish the connection to the first radio network node 12.

Action 807. The second radio network node 13 may receive confirmation information verifying the connection request from the first radio network node 12.

Figure 9:
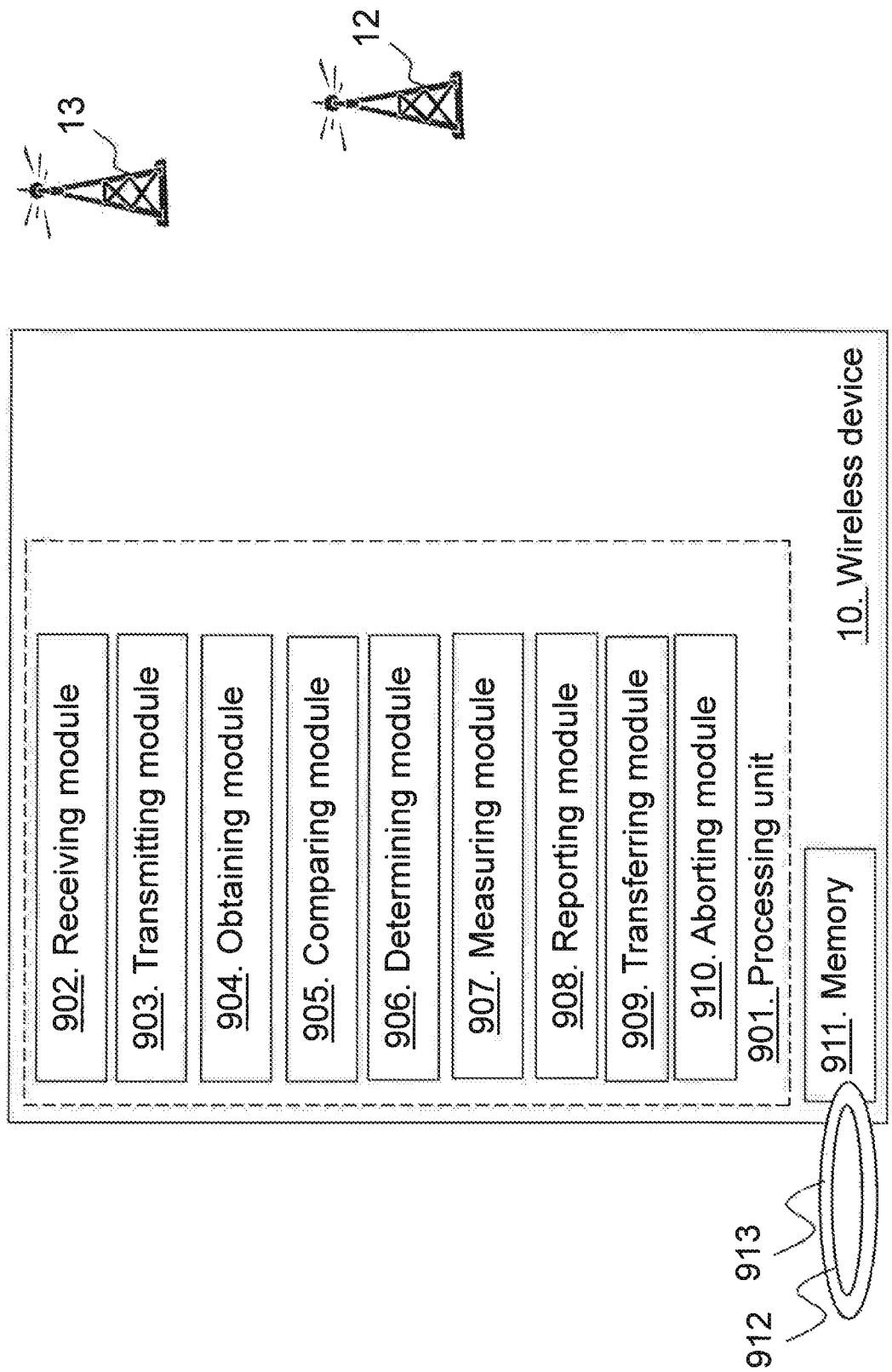
FIG. 9 is a block diagram depicting a wireless device according to embodiments herein.

In order to perform the methods herein the wireless device 10 for handling neighbour relationships between the radio network nodes in the wireless communication network 1 is provided. FIG. 9 shows a block diagram depicting the wireless device 10 for handling neighbour relationships between radio network nodes in the wireless communication network 1. The wireless device 10 is configured to be served by the first radio network node 12 in the wireless communication network 1.

The wireless device 10 may comprise a processing unit 901, e.g. one or more processors, configured to perform the methods herein.

The wireless device 10 may comprise a receiving module 902, e.g. a receiver or a transceiver. The wireless device 10, the processing unit 901, and/or the receiving module 902 is configured to receive, from the first radio network node 12, the report indication indicating that the wireless device 10 is to report information identifying the first radio network node to another radio network node. The wireless device 10, the processing unit 901, and/or the receiving module 902 is further configured to receive the signal from the second radio network node, which signal is associated with the second radio network node.

The wireless device 10 may comprise a transmitting module 903, e.g. a transmitter or a transceiver. The wireless device 10, the processing unit 901, and/or the transmitting module 903 is configured to transmit, to the second radio network node 13, the information identifying the first radio network node 12, e.g. identity of the first radio network node 12.

The wireless device 10 may comprise an obtaining module 904. The wireless device 10, the processing unit 901, and/or the obtaining module 904 may be configured to obtain the information identifying the first radio network node 12, in the report indication, separately or from within the wireless device 10.

The wireless device 10 may comprise a comparing module 905. The received report indication may further indicate that the information is to be reported to a preferred radio network node, and then the wireless device 10, the processing unit 901, and/or the comparing module 905 may be configured to compare the signal strength or quality of the signal from the second radio network node 13 with another signal strength or quality of another signal from one or more other radio network nodes.

When the received report indication may further indicate that the information is to be reported to a preferred radio network node, then, additionally or alternatively, the wireless device 10, the processing unit 901, and/or the comparing module 905 may be configured to compare the signal strength or quality of the signal from the second radio network node 13 with the threshold. The threshold may be configured from the first radio network node 12.

The wireless device 10 may comprise a determining module 906. The wireless device 10, the processing unit 901, and/or the determining module 906 may be configured to determine that the second radio network node 13 is the preferred radio network node when the signal strength or quality is above the other signal strength or quality.

The wireless device 10, the processing unit 901, and/or the determining module 906 may be configured to determine that the second radio network node is a preferred radio network node when the signal strength or quality is above the threshold.

The wireless device 10 may comprise a measuring module 907. The wireless device 10, the processing unit 901, and/or the measuring module 907 may be configured to measure the strength or quality of the signal from the second radio network node 13.

The wireless device 10 may comprise a reporting module 908. The wireless device 10, the processing unit 901, and/or the reporting module 908 may be configured to report the measured strength or quality to the first radio network node 12. The wireless device 10, the processing unit 901, and/or the receiving module 902 may then be configured to receive the selection indication from the first radio network node 12, which selection indication indicates that the wireless device 10 is to report the information identifying the first radio network node to the second radio network node.

The report indication or the selection indication may comprise the identity of the first radio network node 12 identifying the first radio network node 12.

The wireless device 10, the processing unit 901, and/or the receiving module 902 may be configured to receive the report indication or to receive the selection indication by being further configured to receive additional information from the first radio network node 12, which additional information indicates how to contact the first radio network node 12. The wireless device 10 may comprise a transferring module 909. The wireless device 10, the processing unit 901, and/or the transferring module 909 may be configured to transfer the additional information to the second radio network node 13.

The wireless device 10, the processing unit 901, and/or the receiving module 902 may be configured to receive the report indication or to receive the selection indication by being further configured to receive verification information to verify a connection between the first radio network node 12 and the other radio network node. The wireless device 10, the processing unit 901, and/or the transferring module 909 may be configured to transfer the verification information to the second radio network node 13.

The wireless device 10, the processing unit 901, and/or the transmitting module 903 may be configured to transmit the random access request of a connection setup to one or more radio network nodes. The wireless device 10, the processing unit 901, and/or the receiving module 902 may be configured to receive the signal by being configured to receive the random access response from the second radio network node 13 setting up the connection between the wireless device and the second radio network node 13.

The wireless device 10 may comprise an aborting module 910. The wireless device 10, the processing unit 901, and/or the aborting module 910 may be configured to, after the information identifying the first radio network node 12 is transmitted to the second radio network node 13, abort the connection to the second radio network node 13.

The wireless device 10 further comprises a memory 911. The memory comprises one or more units to be used to store data on, such as wireless device capability, signal strengths and/or qualities, thresholds, IDs, additional information, verification information, applications to perform the methods disclosed herein when being executed, and similar.

The methods according to the embodiments described herein for the wireless device 10 are respectively implemented by means of e.g. a computer program 912 or a computer program product, comprising instructions, i.e., software code portions, which, when executed on at least one processor, cause the at least one processor to carry out the actions described herein, as performed by the wireless device 10. The computer program 912 may be stored on a computer-readable storage medium 913, e.g. a disc or similar. The computer-readable storage medium 913, having stored thereon the computer program, may comprise the instructions which, when executed on at least one processor, cause the at least one processor to carry out the actions described herein, as performed by the wireless device 10. In some embodiments, the computer-readable storage medium may be a non-transitory computer-readable storage medium.

Figure 10:
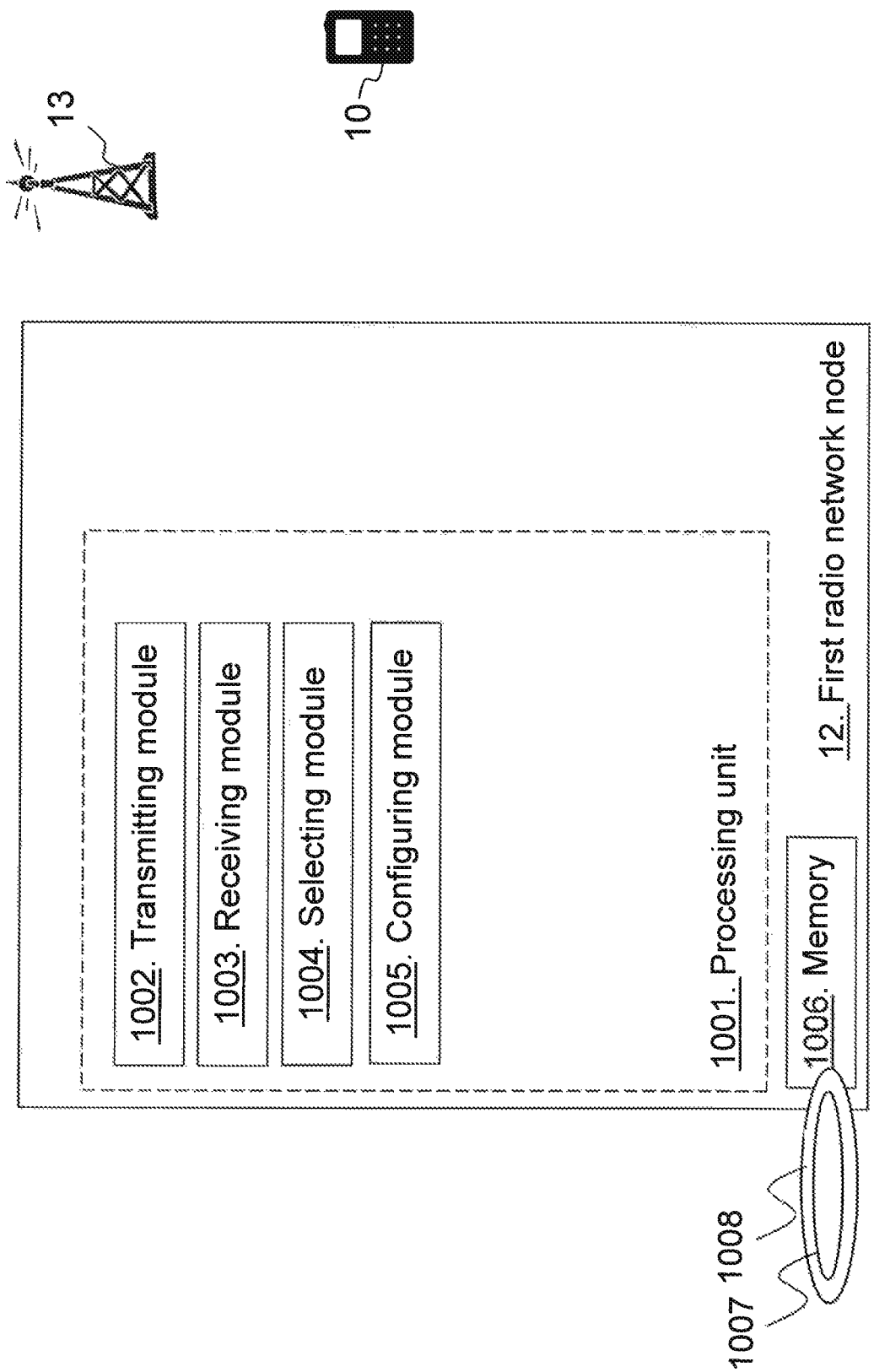
FIG. 10 is a block diagram depicting a first radio network node according to embodiments herein.

In order to perform the methods herein the first radio network node 12 for handling neighbour relationships between the radio network nodes in the wireless communication network 1 is provided. FIG. 10 shows a block diagram depicting the first radio network node 12 for handling the neighbour relationships between the radio network nodes in the wireless communication network. The first radio network node 12 is configured to serve the wireless device 10 in the wireless communication network 1.

The first radio network node 12 may comprise a processing unit 1001, e.g. one or more processors, configured to perform the methods herein.

The first radio network node 12 may comprise a transmitting module 1002, e.g. a transmitter or a transceiver. The first radio network node 12, the processing unit 1001, and/or the transmitting module 1002 is configured to transmit to the wireless device 10, the report indication indicating that the wireless device 10 is to report information identifying the first radio network node 12 to another radio network node. The report indication may further indicate that the information is to be reported to a preferred radio network node.

The first radio network node 12 may comprise a receiving module 1003, e.g. a receiver or a transceiver. The first radio network node 12, the processing unit 1001, and/or the receiving module 1003 may be configured to receive the measurement report from the wireless device 10 indicating the signal strength or quality of the second radio network node 13.

The first radio network node 12 may comprise a selecting module 1004. The first radio network node 12, the processing unit 1001, and/or the selecting module 1004 may be configured to select the second radio network node 13 as a neighbouring radio network node based on the received measurement report.

The first radio network node 12, the processing unit 1001, and/or the transmitting module 1002 may then be configured to transmit the selection indication to the wireless device 10, which selection indication indicates that the wireless device 10 is to report the information identifying the first radio network node 12 to the second radio network node 13, being the selected radio network node. It should be understood that the first radio network node 12 may select a number of radio network nodes as neighbouring radio network nodes.

The report indication or the selection indication may comprise the identity of the first radio network node 12 identifying the first radio network node 12.

The first radio network node 12, the processing unit 1001, and/or the transmitting module 1002 may be configured to transmit the report indication or the selection indication and to transmit additional information to the wireless device for being transferred to the other radio network node, which additional information indicates how to contact the first radio network node 12.

The first radio network node 12, the processing unit 1001, and/or the transmitting module 1002 may be configured to transmit the report indication or the selection indication and to transmit verification information to verify a connection between the first radio network node 12 and the other radio network node.

The first radio network node 12, the processing unit 1001, and/or the receiving module 1003 may be configured to receive the connection request from the second radio network node 13 for establishing a neighbour relationship. The first radio network node 12, the processing unit 1001, and/or the receiving module 1003 may be configured to receive the verification information from the second radio network node 13 verifying the connection.

The first radio network node 12, the processing unit 1001, and/or the transmitting module 1002 may be configured to transmit confirmation information verifying the connection request to the second radio network node 13.

The first radio network node 12 may comprise a configuring module 1005. The first radio network node 12, the processing unit 1001, and/or the configuring module 1005 may be configured to configure the wireless device with the threshold or thresholds of signal strength or quality.

The first radio network node 12 further comprises a memory 1006. The memory comprises one or more units to be used to store data on, such as wireless device capability, signal strengths and/or qualities, thresholds, IDs, additional information, neighbour relationships, verification information, applications to perform the methods disclosed herein when being executed, and similar.

The methods according to the embodiments described herein for the first radio network node 12 are respectively implemented by means of e.g. a computer program 1007 or a computer program product, comprising instructions, i.e., software code portions, which, when executed on at least one processor, cause the at least one processor to carry out the actions described herein, as performed by the first radio network node 12. The computer program 1007 may be stored on a computer-readable storage medium 1008, e.g. a disc or similar. The computer-readable storage medium 1008, having stored thereon the computer program, may comprise the instructions which, when executed on at least one processor, cause the at least one processor to carry out the actions described herein, as performed by the first radio network node 12. In some embodiments, the computer-readable storage medium may be a non-transitory computer-readable storage medium.

Figure 11:
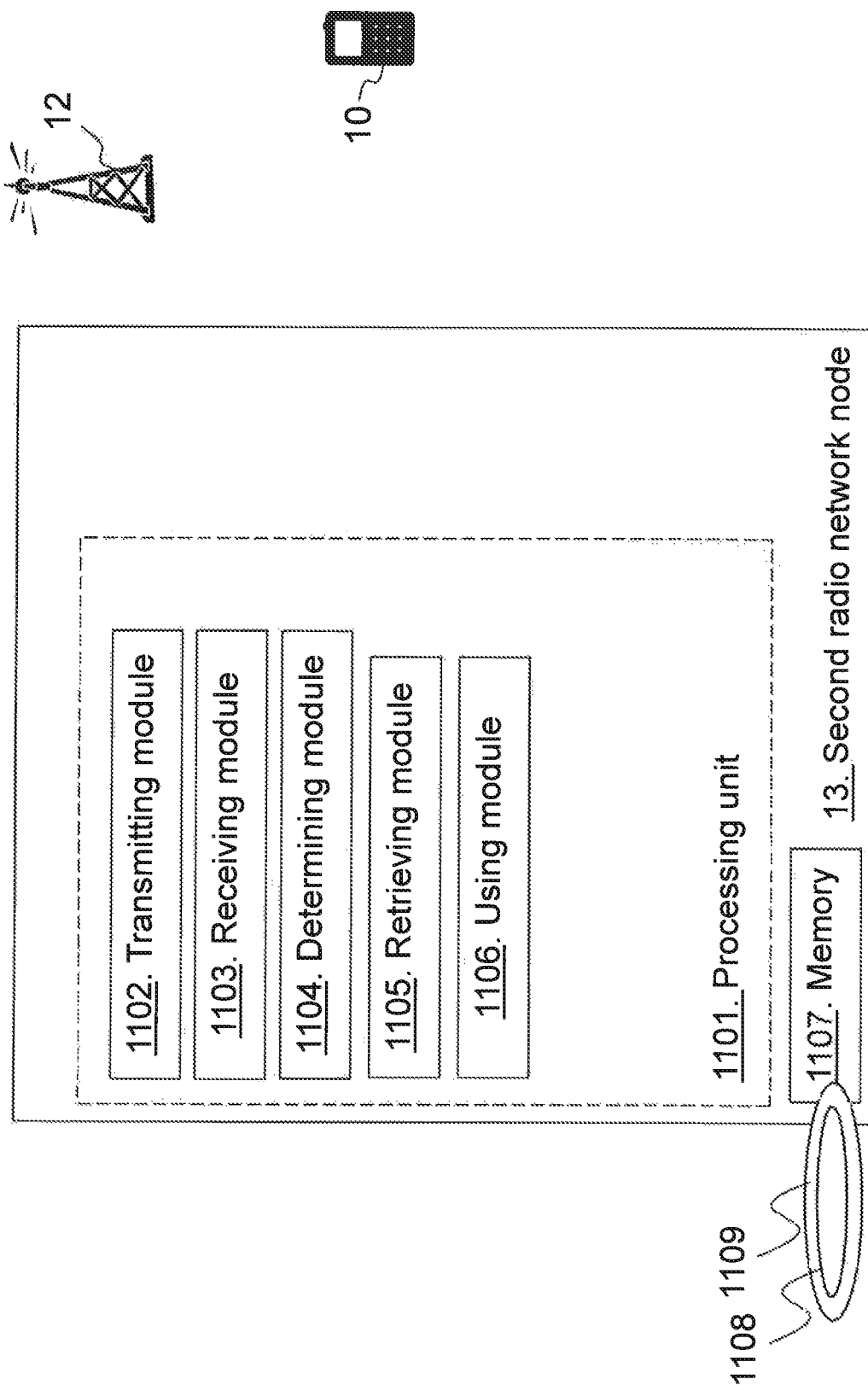
FIG. 11 is a block diagram depicting a second radio network node according to embodiments herein.

In order to perform the methods herein the second radio network node 13 for handling neighbour relationships between the radio network nodes in the wireless communication network 1 is provided. FIG. 11 shows a block diagram depicting the second radio network node 13 for handling the neighbour relationships between the radio network nodes in a wireless communication network 1. The wireless communication network comprises the first radio network node 12 serving the wireless device 10. The second radio network node 13 may comprise a processing unit 1101, e.g. one or more processors, configured to perform the methods herein.

The second radio network node 13 may comprise a transmitting module 1102, e.g. a transmitter or a transceiver. The second radio network node 13, the processing unit 1101, and/or the transmitting module 1102 is configured to transmit the signal to the wireless device 10, which signal is associated with the second radio network node 13.

The second radio network node 13 may comprise a receiving module 1103, e.g. a receiver or a transceiver. The second radio network node 13, the processing unit 1101, and/or the receiving module 1103 is configured to receive, from the wireless device 10, information identifying the first radio network node 12. The second radio network node 13, the processing unit 1101, and/or the receiving module 1103 may be configured to receive additional information from the wireless device 10, which additional information indicates how to contact the first radio network node 12. The second radio network node 13, the processing unit 1101, and/or the receiving module 1103 may be configured to receive verification information from the wireless device 10, which verification information is for verifying the connection between the first radio network node 12 and the second radio network node 13.

The second radio network node 13 may comprise a determining module 1104. The second radio network node 13, the processing unit 1101, and/or the determining module 1104 is configured to determine whether to establish a neighbour relationship with the first radio network node based on the received information.

The second radio network node 13, the processing unit 1101, and/or the transmitting module 1102 may be configured to transmit, when determined to establish the neighbour relationship with the first radio network node 12 the second radio network node, the connection request to the first radio network node 12 for establishing the neighbour relationship using the received information identifying the first radio network node 12 and/or the received additional information.

The second radio network node 13, the processing unit 1101, and/or the transmitting module 1102 may be configured to transmit the verification information to the first radio network node verifying the connection.

The second radio network node 13, the processing unit 1101, and/or the receiving module 1103 may be configured to receive confirmation information verifying the connection request from the first radio network node 12.

The second radio network node 13, the processing unit 1101, and/or the receiving module 1103 may be configured to receive from the wireless device 10, the random access request of a connection setup. Then, the second radio network node 13, the processing unit 1101, and/or the transmitting module 1102 may be configured to transmit the random access response to the wireless device 10, and wherein connection to the wireless device 10 is aborted after the information identifying the first radio network node 12 is received.

The second radio network node 13 may comprise a retrieving module 1105. The second radio network node 13, the processing unit 1101, and/or the retrieving module 1105 is configured to retrieve address information for the first radio network node from another network node. The second radio network node 13 may comprise a using module 1106. The second radio network node 13, the processing unit 1101, and/or the using module 1105 is configured to use the address information to establish the connection to the first radio network node 12.

The second radio network node 13 further comprises a memory 1107. The memory comprises one or more units to be used to store data on, such as wireless device capability, IDs, additional information, neighbour relationships, verification information, applications to perform the methods disclosed herein when being executed, and similar.

The methods according to the embodiments described herein for the second radio network node 13 are respectively implemented by means of e.g. a computer program 1108 or a computer program product, comprising instructions, i.e., software code portions, which, when executed on at least one processor, cause the at least one processor to carry out the actions described herein, as performed by the second radio network node 13. The computer program 1108 may be stored on a computer-readable storage medium 1109, e.g. a disc or similar. The computer-readable storage medium 1109, having stored thereon the computer program, may comprise the instructions which, when executed on at least one processor, cause the at least one processor to carry out the actions described herein, as performed by the second radio network node 13. In some embodiments, the computer-readable storage medium may be a non-transitory computer-readable storage medium.

In some embodiments a more general term "radio network node" is used and it can correspond to any type of radio network node or any network node, which communicates with a UE and/or with another network node. Examples of network nodes are NodeB, MeNB, SeNB, a network node belonging to MCG or SCG, base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in distributed antenna system (DAS), core network node (e.g. Mobile Switching Centre (MSC), Mobility Management Entity (MME) etc), Operation and Maintenance (O&M), Operation Support System (OSS), Self-Organizing Network (SON), positioning node (e.g. E-SMLC), Minimizing Drive Test (MDT) etc.

In some embodiments the non-limiting term user equipment (UE) is used and it refers to any type of wireless device communicating with a network node and/or with another UE in a cellular or mobile communication system. Examples of UE are target device, device to device (D2D) UE, proximity capable UE (aka ProSe UE), machine type UE or UE capable of machine to machine (M2M) communication, PDA, PAD, Tablet, mobile terminals, smart phone, laptop embedded equipped (LEE), laptop mounted equipment (LME), USB dongles etc.

The embodiments are applicable to single carrier as well as to multicarrier or carrier aggregation (CA) operation of the UE in which the UE is able to receive and/or transmit data to more than one serving cells. The term carrier aggregation (CA) is also called (e.g. interchangeably called) "multi-carrier system", "multi-cell operation", "multi-carrier operation", "multi-carrier" transmission and/or reception. In CA one of the component carriers (CCs) is the primary component carrier (PCC) or simply primary carrier or even anchor carrier. The remaining ones are called secondary component carrier (SCC) or simply secondary carriers or even supplementary carriers. The serving cell is interchangeably called as primary cell (PCell) or primary serving cell (PSC). Similarly the secondary serving cell is interchangeably called as secondary cell (SCell) or secondary serving cell (SSC).

The embodiments are described for 5G. However the embodiments are applicable to any RAT or multi-RAT systems, where the UE receives and/or transmit signals (e.g. data) e.g. LTE FDD/TDD, WCDMA/HSPA, GSM/GERAN, Wi Fi, WLAN, CDMA2000 etc.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications devices will appreciate the cost, performance, and maintenance tradeoffs inherent in these design choices.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

ABBREVIATIONS

3GPP 3rd Generation Partnership Project
BPU Baseband Processing Unit
CN Core Network
DM Domain Manager
E-UTRAN Evolved-Universal Terrestrial Radio Access Network
ECGI Eutran Cell Global Identity
EPC Evolved Packet Core
EPS Evolved Packet System
eNB evolved Node B
ID Identity
IP Internet Protocol
LTE Long Term Evolution
MME Mobility Management Entity
NE Network Element
NM Network Manager
NW Network
OSS Operations and Support System
PPN Packet Processing Node
RAN Radio Access Network
RCN Radio Control Node
RFC Request for Comments
RU Radio Unit
S-GW Serving Gateway
SON Self-organizing Networks
TNL Transport Network Layer
UE User Equipment
VLAN Virtual Local Area Network
X2 Interface between two eNBs

The invention claimed is:

1. A first radio network node configured for handling neighbor relationships between radio network nodes in a wireless communication network, wherein the first radio network node is configured to serve a wireless device in the wireless communication network, the first radio network node comprising:
communication circuitry configured for communicating with the wireless device and other radio network nodes; and
processing circuitry operatively associated with the communication circuitry and configured to:
transmit to the wireless device, a report indication indicating that the wireless device is to report information identifying the first radio network node to another radio network node;
receive a measurement report from the wireless device indicating a signal strength or quality of a second radio network node;
select the second radio network node as a neighboring radio network node based on the received measurement report; and
transmit a selection indication to the wireless device, wherein the selection indication indicates that the wireless device is to report the information identifying the first radio network node to the second radio network node,
wherein the processing circuitry is configured to transmit the report indication or the selection indication and to transmit verification information to verify a connection between the first radio network node and an other radio network node, wherein the processing circuitry is configured to receive the verification information from the second radio network node verifying the connection.

2. The first radio network node according to claim 1, wherein the report indication further indicates that the information is to be reported to a preferred radio network node.

3. The first radio network node according to claim 1, wherein the processing circuitry is configured to transmit the report indication or the selection indication and to transmit additional information to the wireless device for being transferred to an other radio network node, wherein the additional information indicates how to contact the first radio network node.

4. The first radio network node according to claim 1, wherein the processing circuitry is configured to receive a connection request from a second radio network node for establishing a neighbor relationship.

5. A second radio network node configured for handling neighbor relationships between radio network nodes in a wireless communication network, wherein the wireless communication network comprises a first radio network node serving a wireless device, the second radio network node comprising:
communication circuitry configured for communicating with the wireless device and other radio network nodes; and
processing circuitry operatively associated with the communication circuitry and configured to:

transmit a signal to the wireless device, wherein the signal is associated with the second radio network node;

receive, from the wireless device, information identifying the first radio network node, wherein the processing circuitry is configured to receive verification information from the wireless device, wherein the verification information is for verifying a connection between the first radio network node and the second radio network node, wherein the processing circuitry is configured to transmit the verification information to the first radio network node verifying the connection; and determine whether to establish a neighbor relationship with the first radio network node based on the received information.

6. The second radio network node according to claim 5, wherein the processing circuitry is configured to receive additional information from the wireless device, wherein the additional information indicates how to contact the first radio network node.

7. The second radio network node according to claim 5, responsive to establishing the neighbor relationship with the first radio network node and the second radio network node, the processing circuitry is configured to transmit a connection request to the first radio network node for establishing the neighbor relationship using the received information identifying the first radio network node and/or the received additional information.

8. The second radio network node according to claim 5, wherein the processing circuitry is configured to retrieve address information for the first radio network node from another network node and use the address information to establish a connection to the first radio network node.

* * * * *